Dec. 13, 1932.  W. E. MOLINS  1,890,652
PACKET MAKING MACHINE
Filed Oct. 28, 1927     17 Sheets-Sheet 7

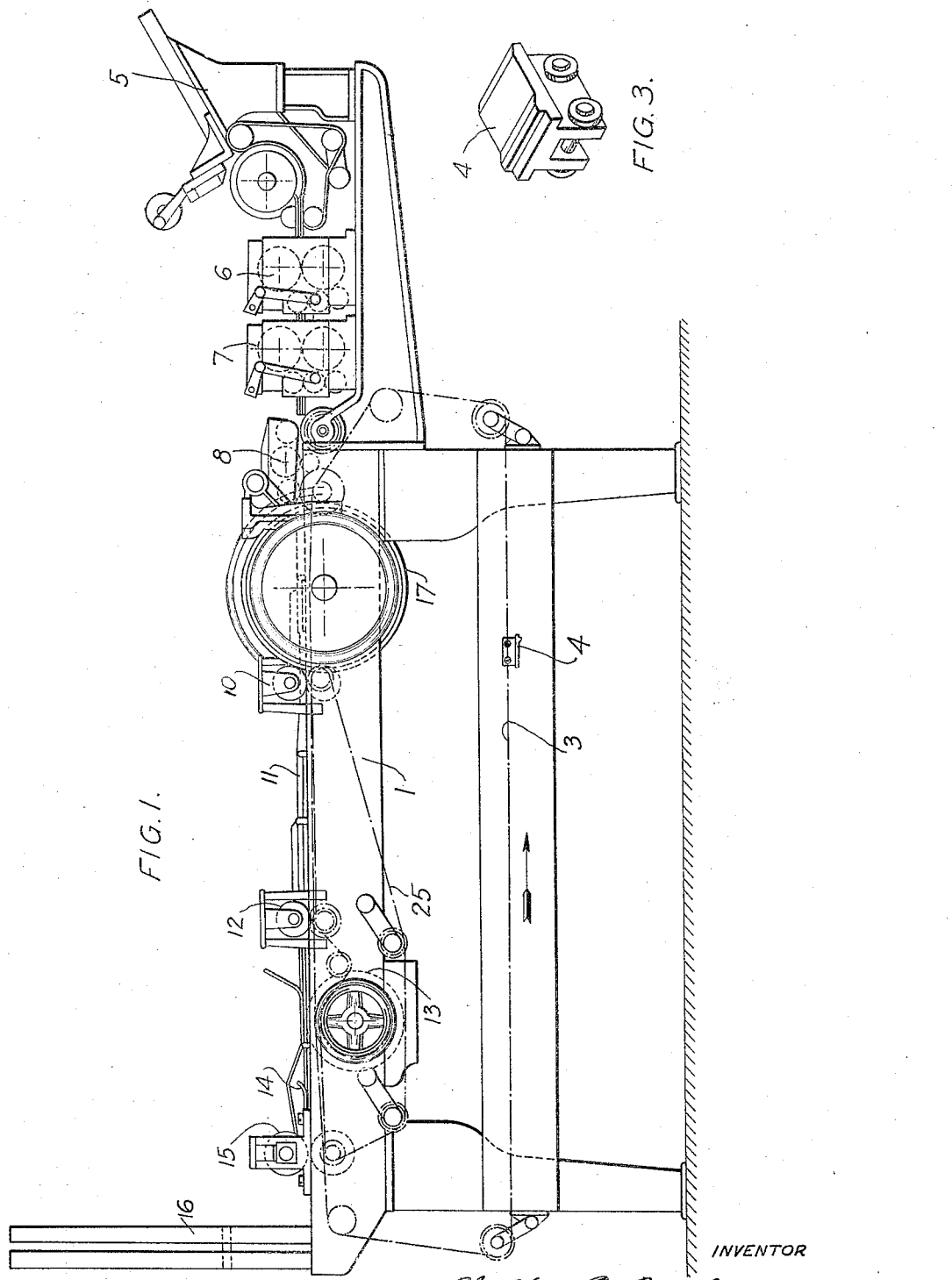

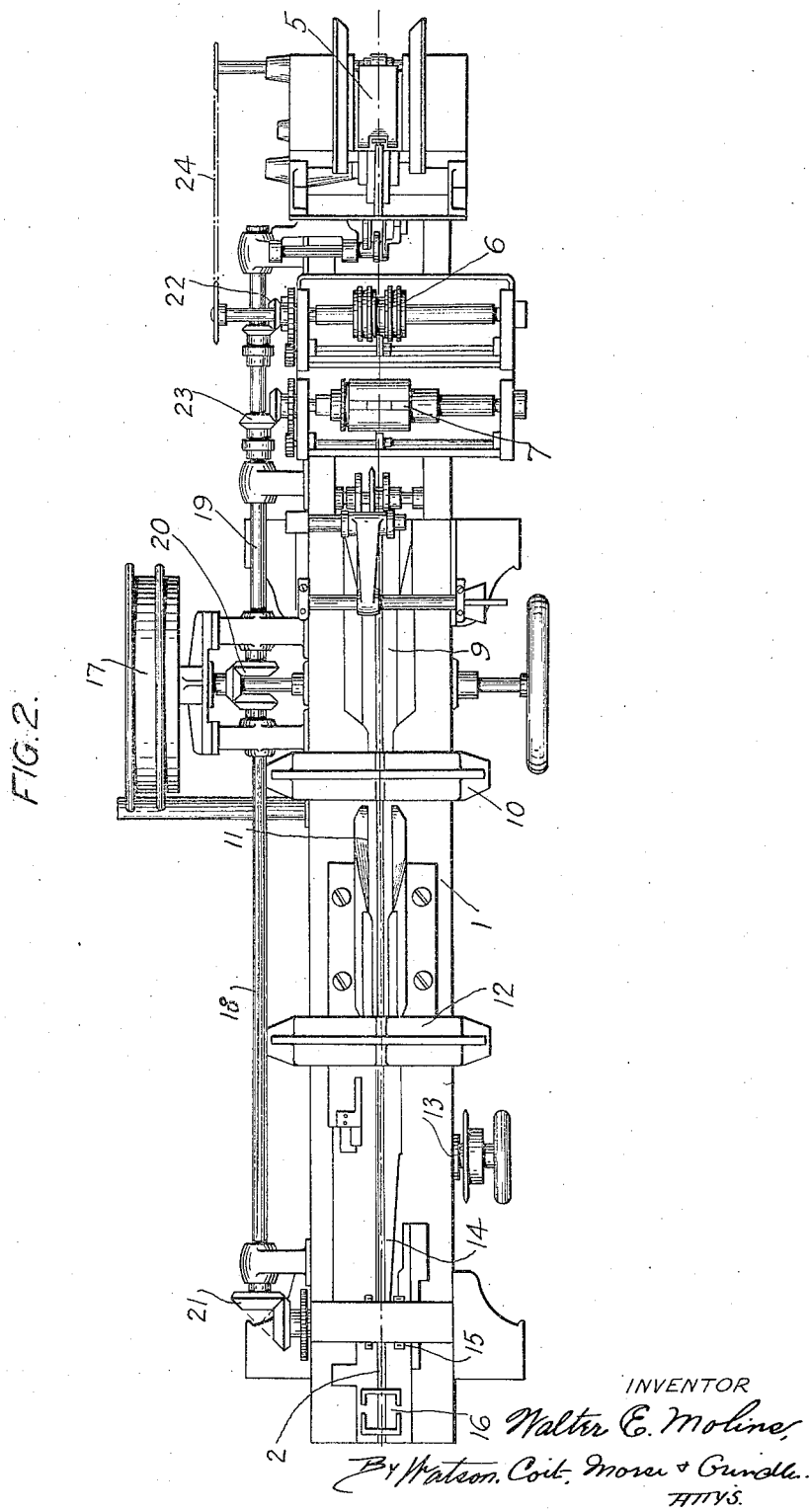

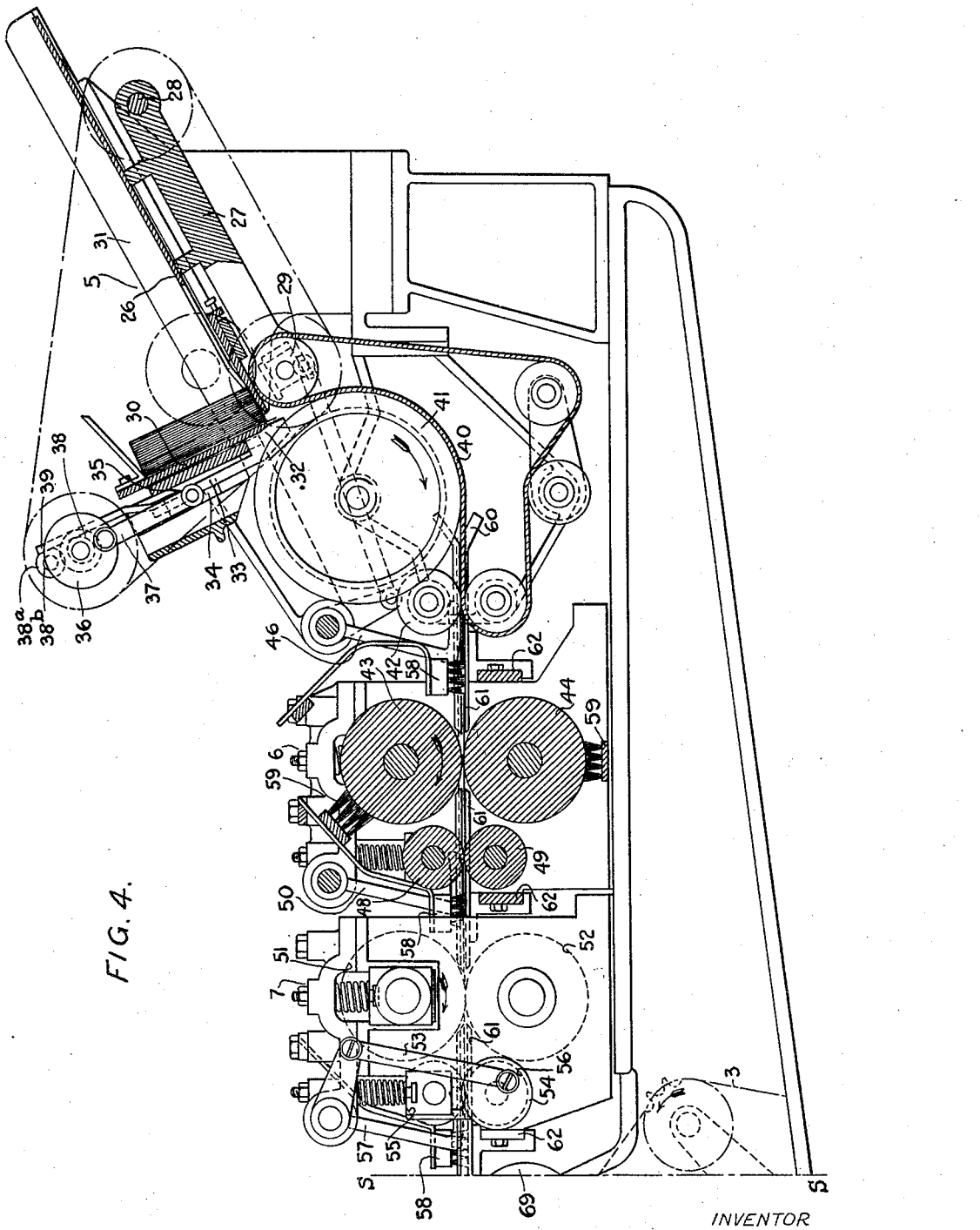

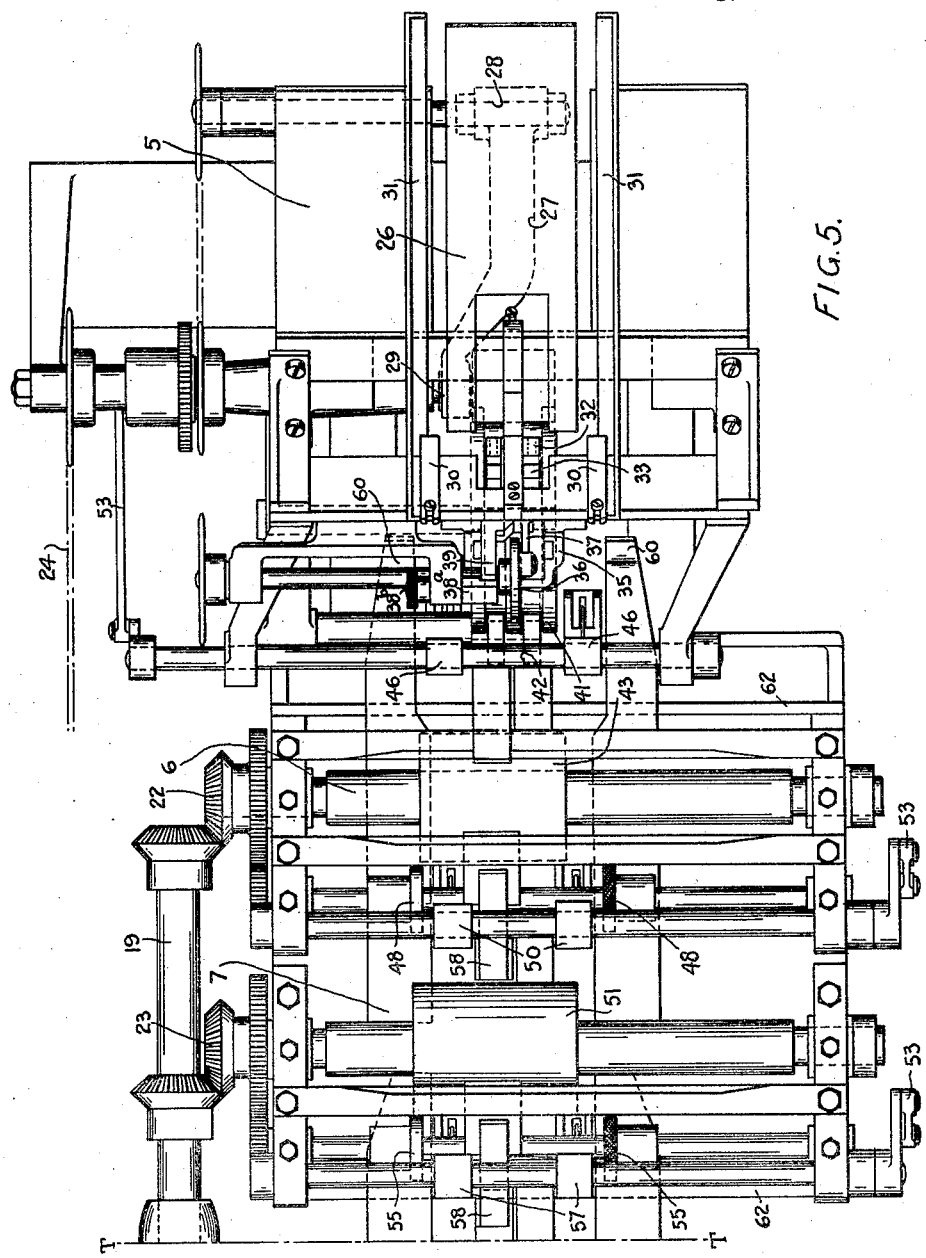

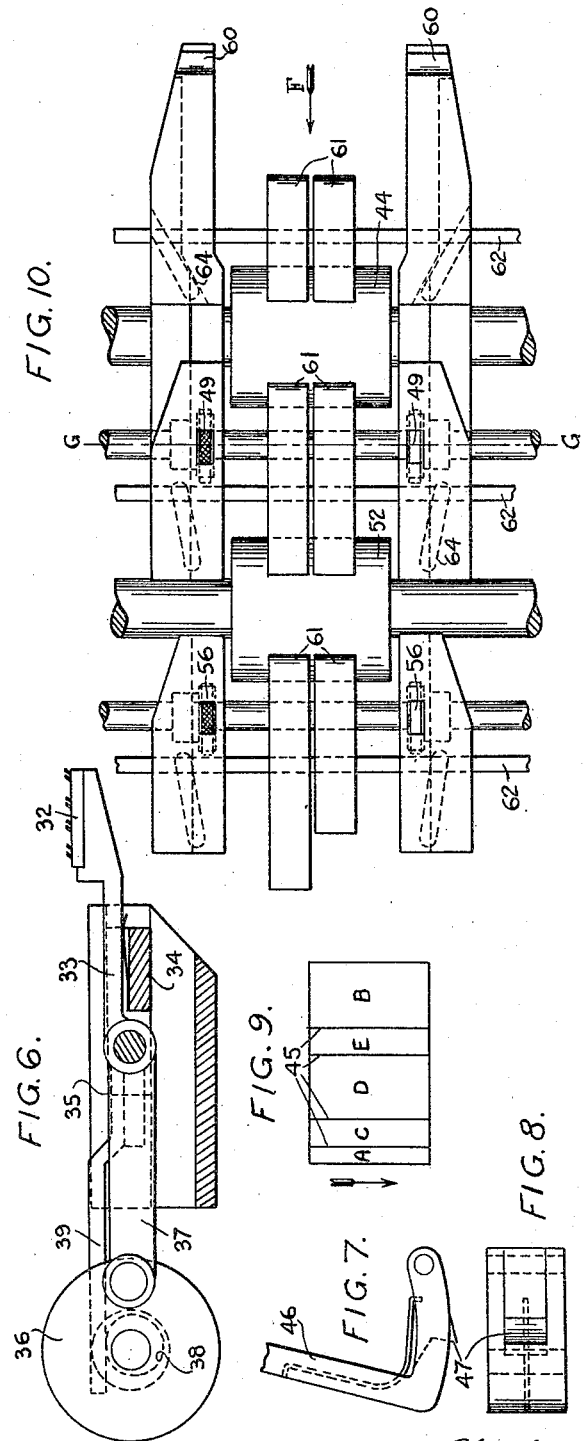

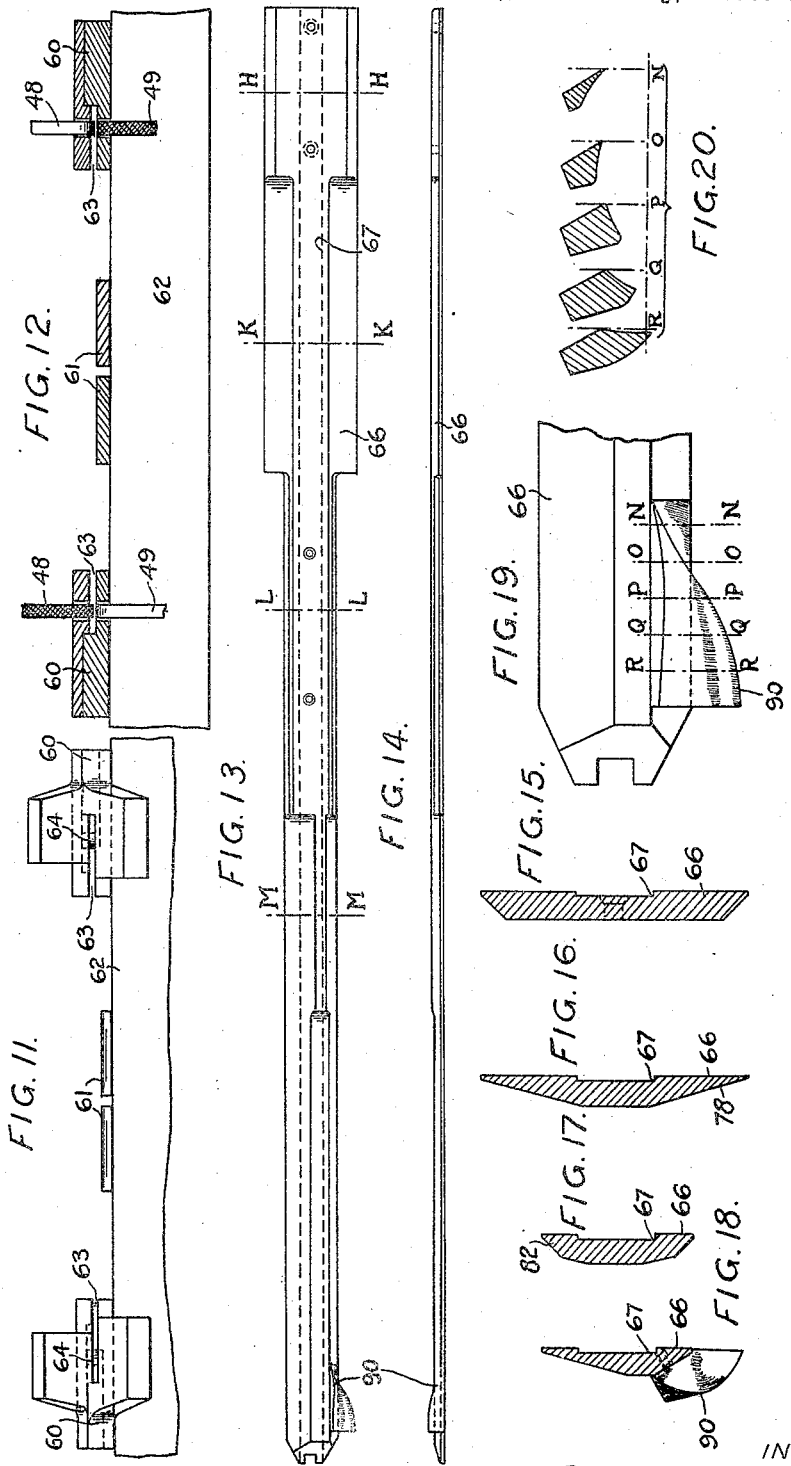

INVENTOR
Walter E. Molins
By Watson, Coit, Morse & Grindle
ATTYS.

Dec. 13, 1932.    W. E. MOLINS    1,890,652
PACKET MAKING MACHINE
Filed Oct. 28, 1927    17 Sheets-Sheet 9

INVENTOR
Walter E. Molins.
By Watson, Coit, Morse & Grindle
ATTYS.

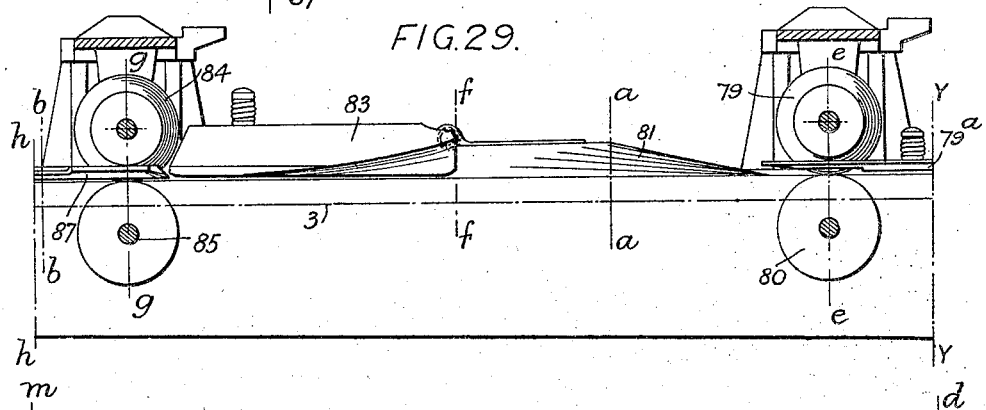

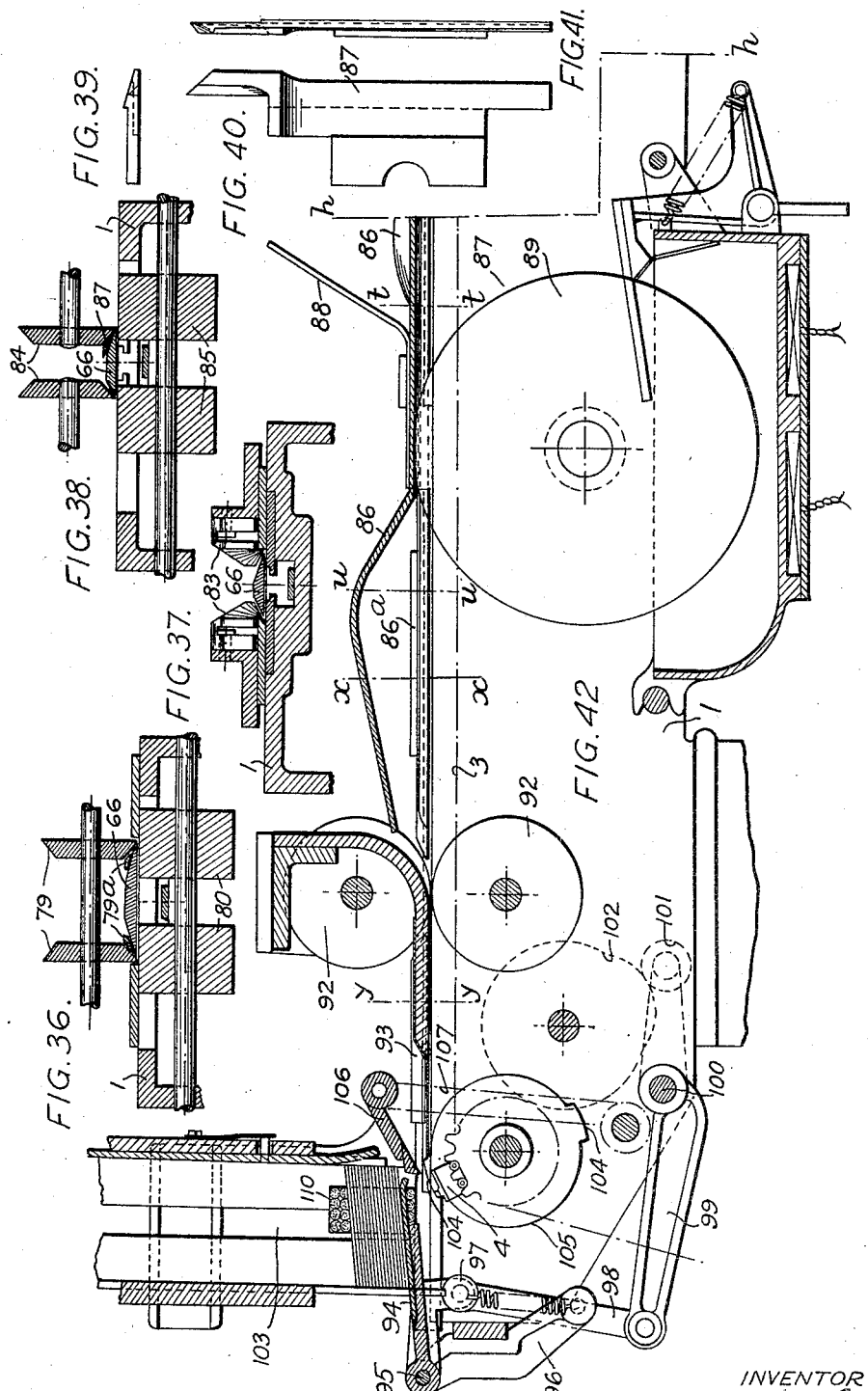

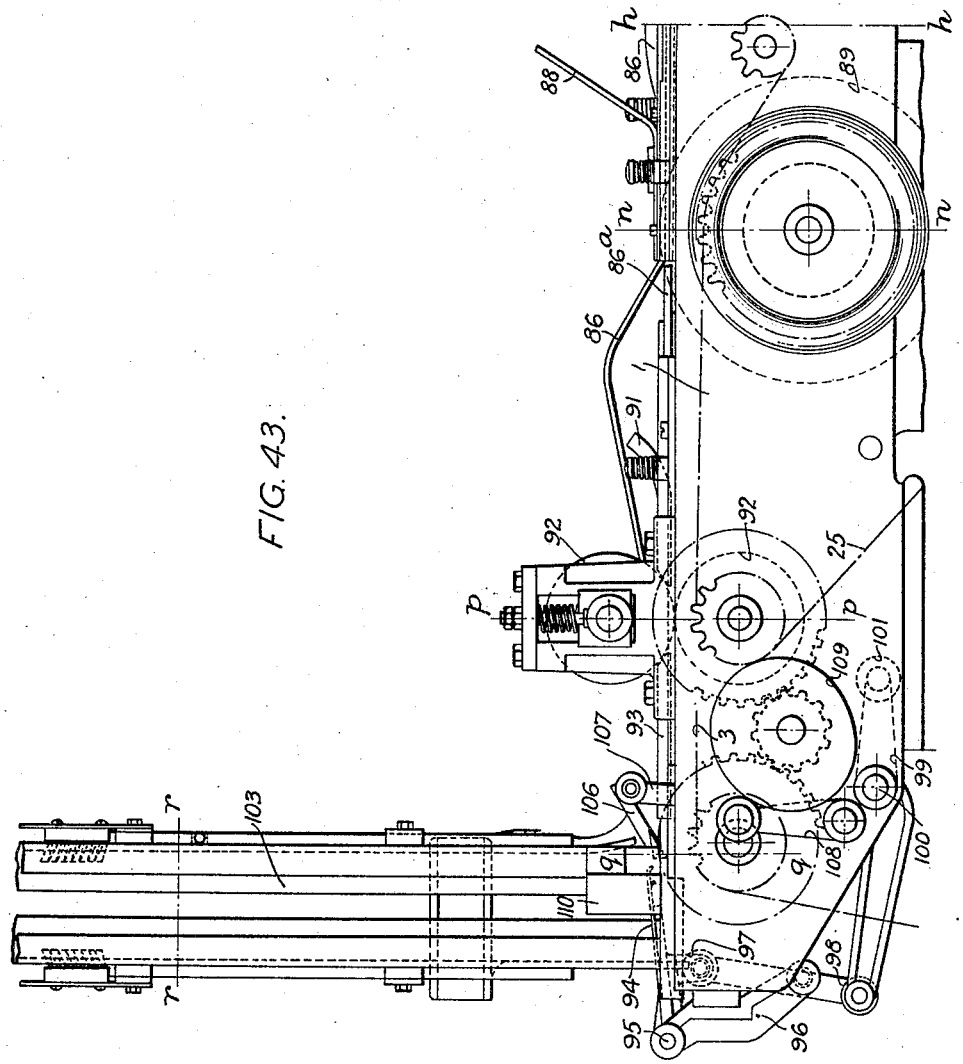

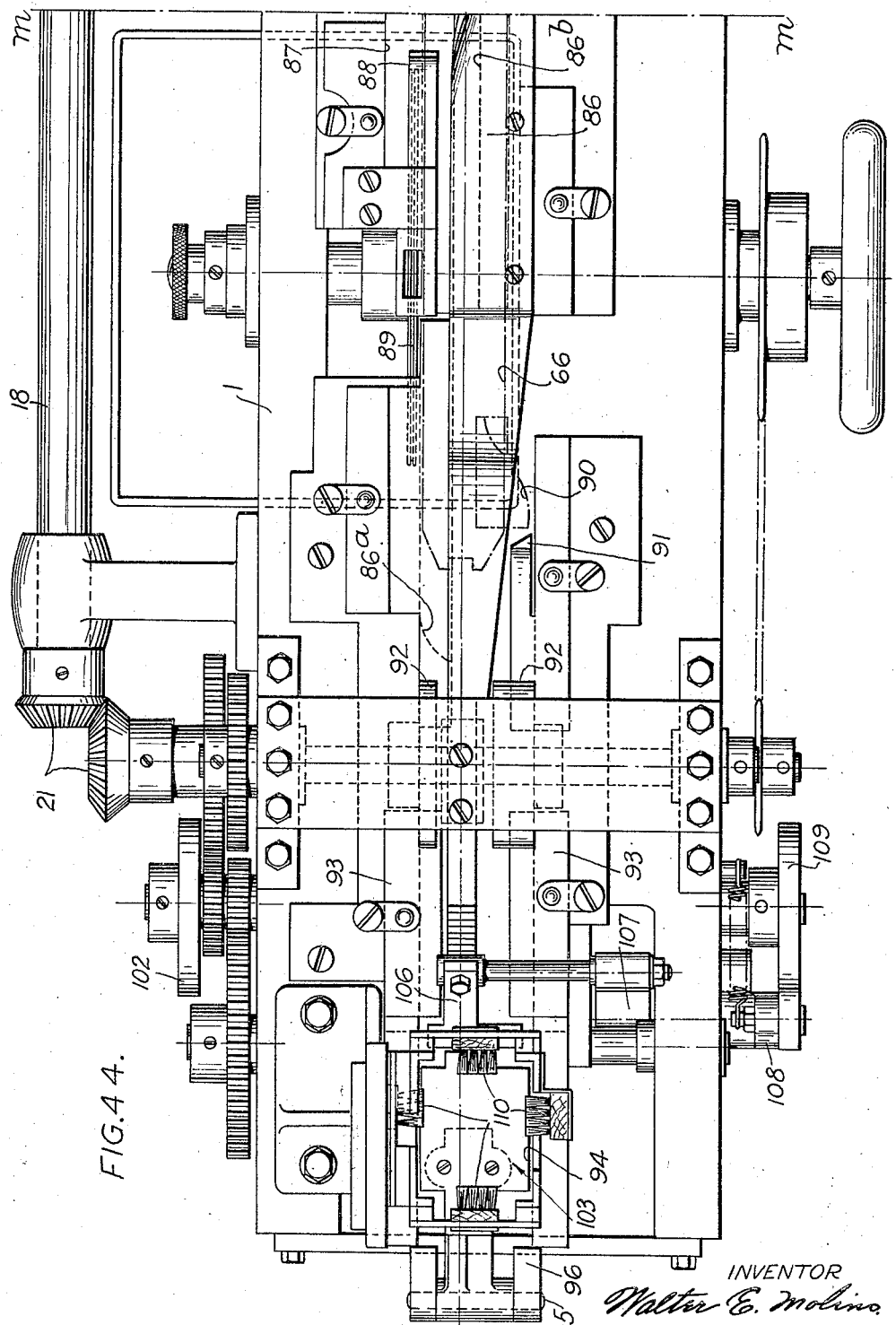

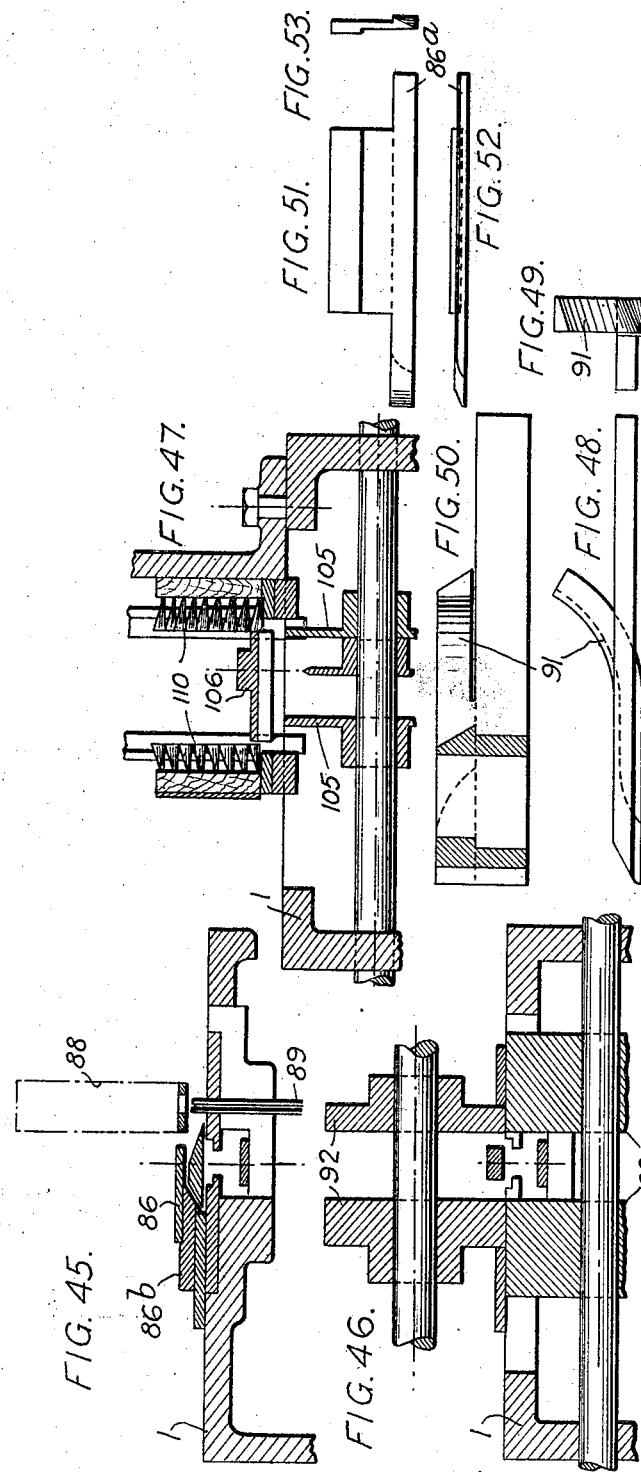

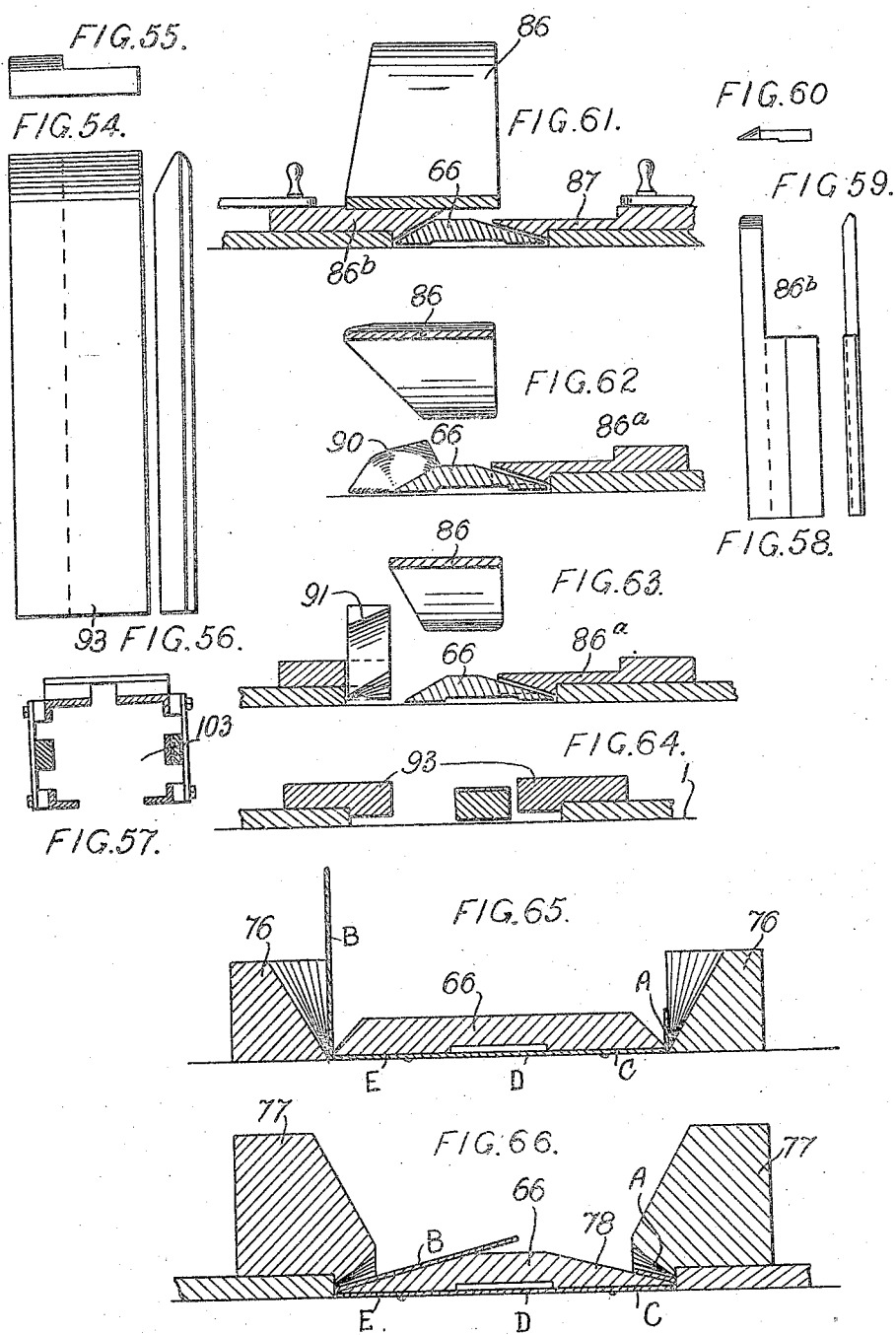

Dec. 13, 1932.  W. E. MOLINS  1,890,652
PACKET MAKING MACHINE
Filed Oct. 28, 1927   17 Sheets-Sheet 16
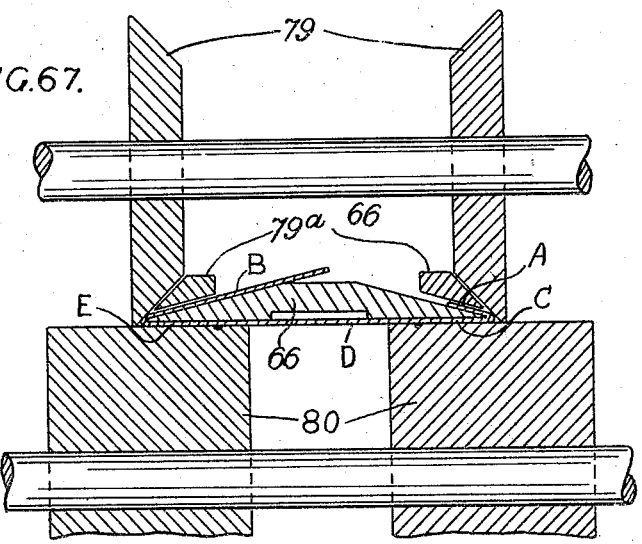
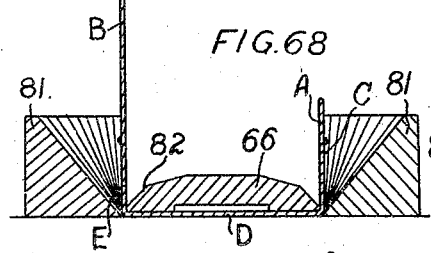
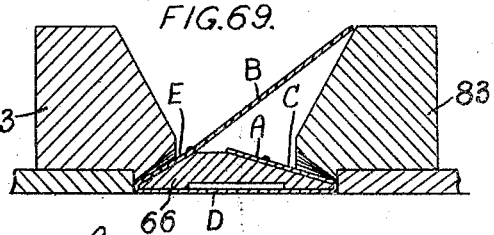
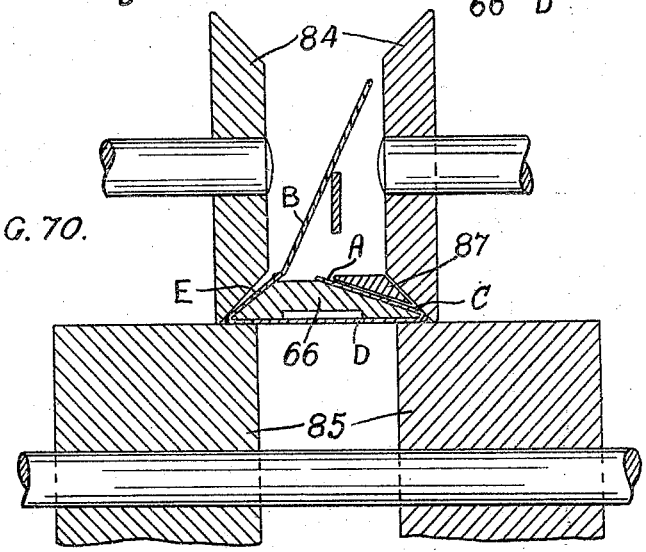

Dec. 13, 1932.  W. E. MOLINS  1,890,652
PACKET MAKING MACHINE
Filed Oct. 28, 1927   17 Sheets-Sheet 17
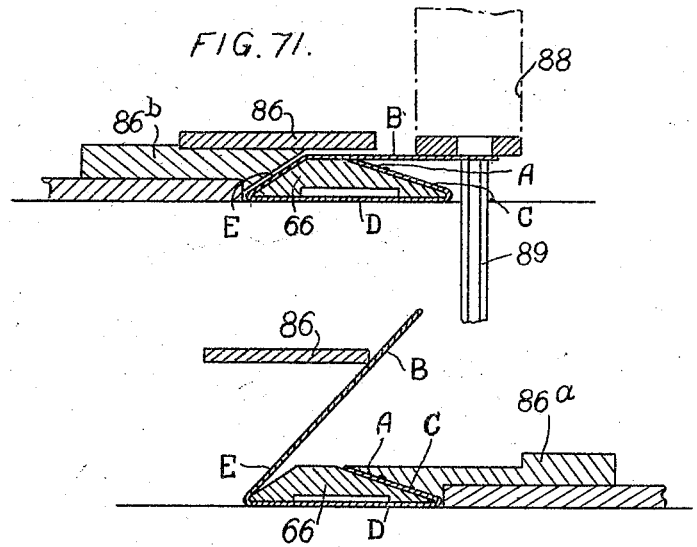
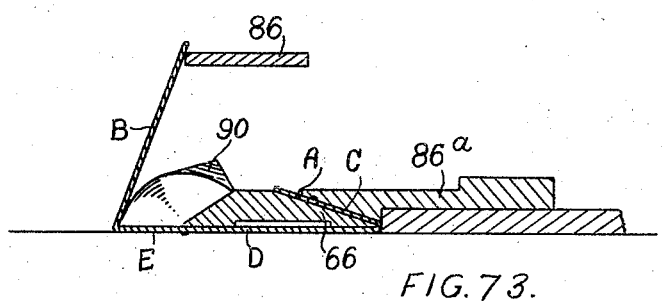
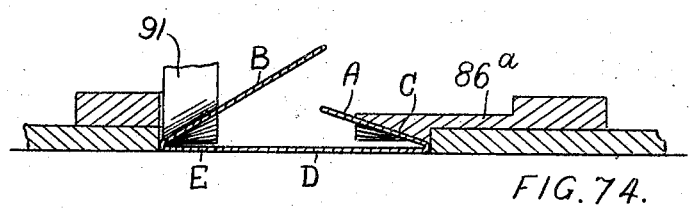
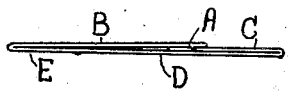
FIG. 75
INVENTOR
Walter E. Molins
By Watson, Coit, Morse & Grindle
ATTYS.

Patented Dec. 13, 1932

1,890,652

UNITED STATES PATENT OFFICE

WALTER EVERETT MOLINS, OF DEPTFORD, LONDON, ENGLAND

PACKET MAKING MACHINE

Application filed October 28, 1927, Serial No. 229,475, and in Great Britain November 12, 1926.

This invention is for improvements in or relating to packet making machines and more particularly to a machine adapted to form the shell of a slide and shell packet, and has for its object the provision of means whereby the blanks from which the shells are formed are subjected to a sequence of operations which ensure that the shell is produced without the liability of the side edges becoming unstuck once they are pressed into engagement with one another.

It will be appreciated that in machines where the side edges of the blank are stuck together prior to some or all of the scoring lines on the blank being crushed and broken down, there is a tendency when these lines are being folded and broken, for the adhesion between the stuck side edges thereof to be displaced relatively to one another.

The present invention consists of a shell making machine wherein the operations of folding and breaking all the panels of a scored blank about their corresponding scoring lines are completed prior to the two side edges of the blank being brought into contact with one another.

Further, the present invention consists of a shell making machine as set forth in the preceding paragraph, characterized by each blank being moved by one of a series of pusher pieces (spaced along a continuously moving conveyor) through folders arranged to fold the panels of the blank about the corresponding scoring lines, in such a manner that the pusher piece is always located centrally of that portion of the blank which lies adjacent to the bed of the machine.

Further, the present invention consists of a shell making machine wherein the blanks are automatically fed from a stack through scoring and folding mechanism, characterized by means being provided for pushing the blanks through the machine and thereby ensuring that each blank is maintained in a definite spaced relationship relatively to the next succeeding blank.

The invention is more particularly described with reference to the accompanying drawings, in which:—

Fig. 1 is a small scale side elevation showing the general arrangement of the machine.

Fig. 2 is a plan view of Fig. 1.

Fig. 3 is a perspective view of a pusher piece carried upon an endless conveyor.

Fig. 4 shows a side elevation of the blank feeding, creasing and embossing mechanism, partly in section and to a larger scale than that illustrated in Fig. 1.

Fig. 5 is a plan view of Fig. 4.

Fig. 6 shows a section on an enlarged scale of the needle feed action of the blank feed illustrated in Fig. 4.

Figs. 7 and 8 show in elevation and plan a pawl mechanism of the oscillating arms 46, 50 and 57 illustrated in Fig. 4.

Fig. 9 shows a blank as discharged from the scoring and embossing mechanism illustrated in Fig. 4.

Fig. 10 is a plan view of the blank guides in the feeding, creasing and embossing mechanism.

Fig. 11 is an end view of Fig. 10 looking in the direction of the arrow F.

Fig. 12 is a section on line GG of Fig. 10.

Fig. 13 is a plan of the former over which the blanks are folded and broken.

Fig. 14 is a side elevation of Fig. 13.

Figs. 15, 16, 17 and 18 are sections of Fig. 13 on the lines HH, KK, LL and MM.

Fig. 19 is an enlarged view of one end of the former showing a blank opener attached thereto.

Fig. 20 shows a series of sections of the opener illustrated in Fig. 19 on the lines NN, OO, PP, QQ and RR.

Figure 21:
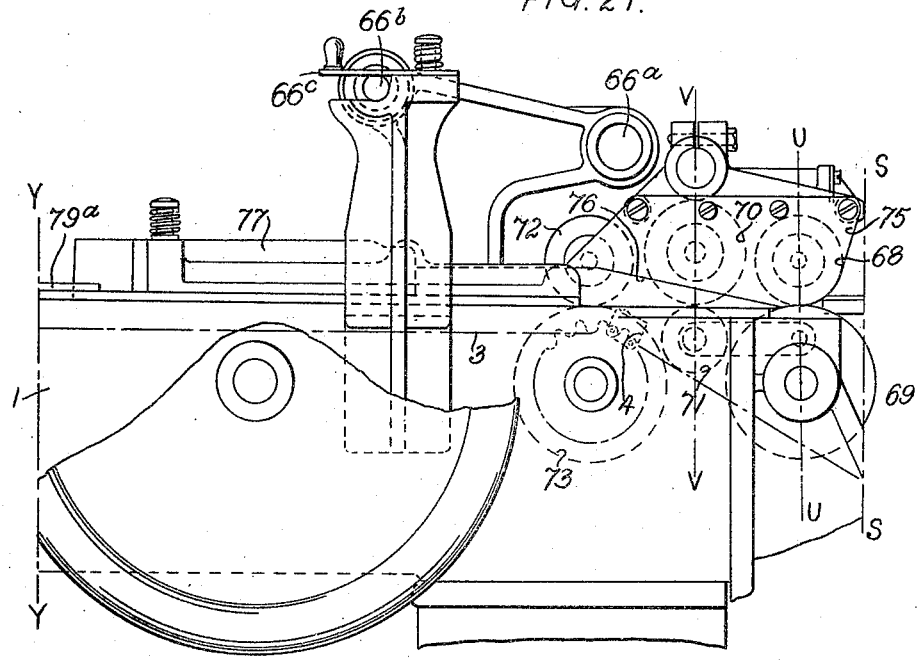

Fig. 21 is a side elevation of a section of the shell forming mechanism and joins up with Fig. 4 on line SS.

Figure 22:
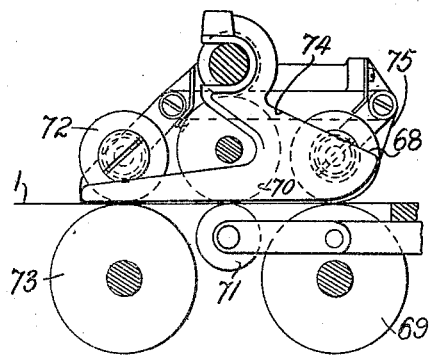

Fig. 22 is a detailed illustration of the feed'ng rollers and guides of Fig. 21.

Figure 23:
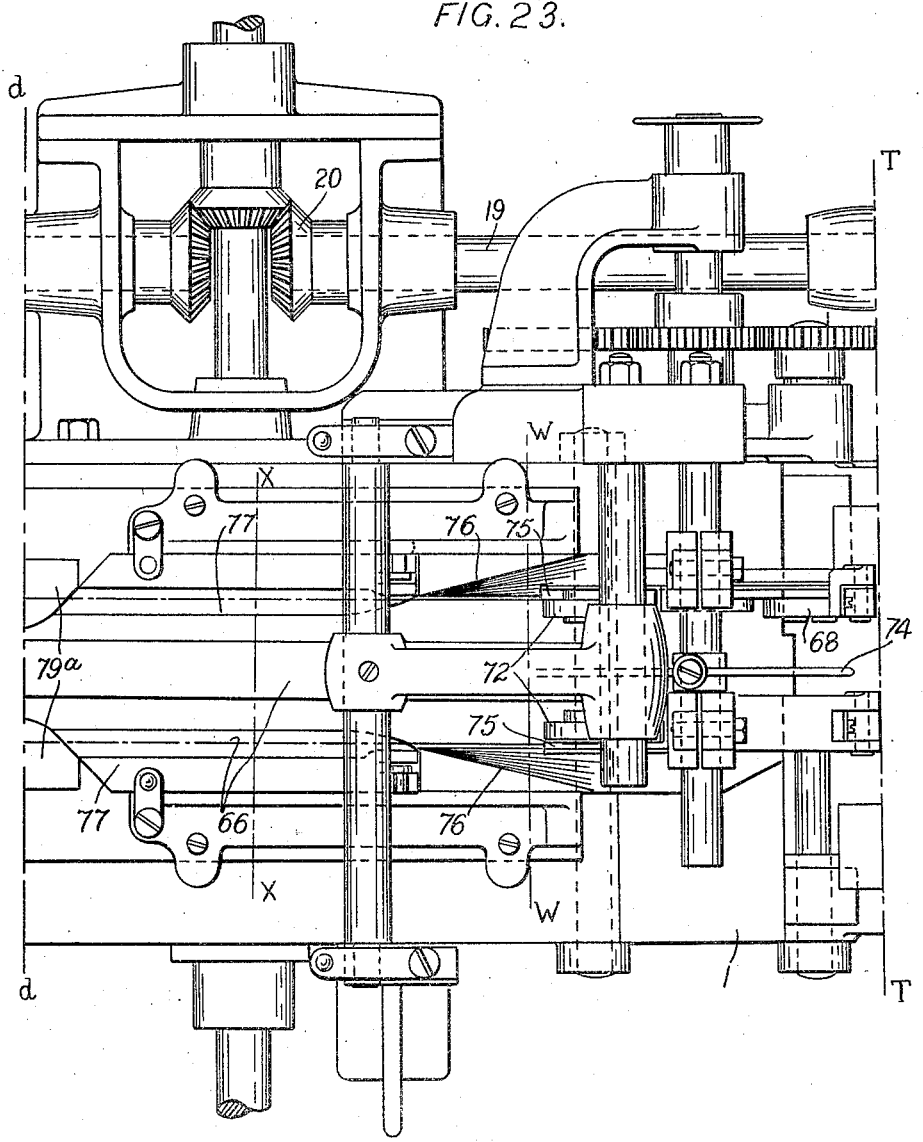

Fig. 23 is a plan of Fig. 21 and joins up with Fig. 5 on line TT.

Figure 24:
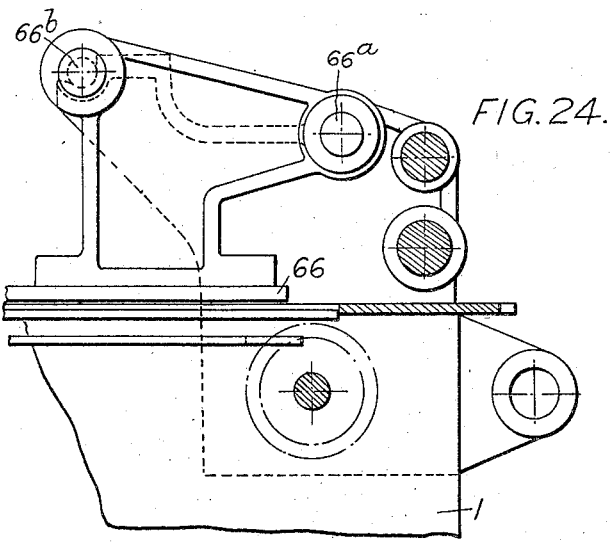

Fig. 24 shows the method of mounting the former bar.

Figure 25:
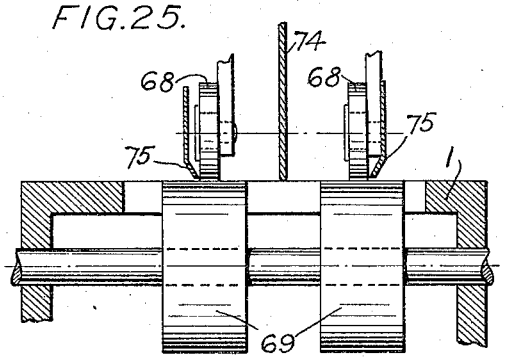
Figures 26, 34, 35:
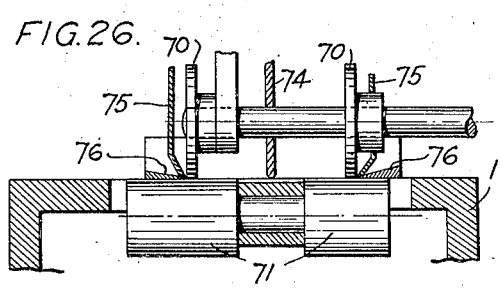

Figs. 25 and 26 are sections of Fig. 21 on lines UU and VV respectively.

Figs. 27 and 28 show cross sections of the folders 76 and 77 on the lines WW and XX of Fig. 23.

Fig. 29 shows a sectional elevation of the next section of the machine and joins up with Fig. 21 on line YY.

Fig. 30 is a plan of Fig. 29 and joins up with Fig. 23 on line dd.

Figs. 31 and 32 are cross sections of the folders 81 and guides 86 and 87 on the lines aa, bb, Fig. 29.

Figure 33:
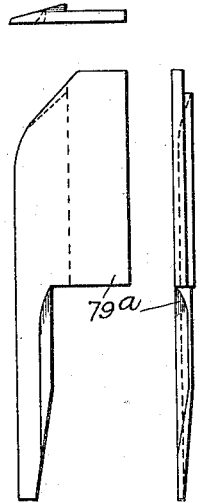

Figs. 33, 34 and 35 show three views of the guide 79a (Fig. 29).

Figs. 36, 37 and 38 show cross sections of Fig. 29 on lines ee, ff, gg.

Figs. 39, 40 and 41 show three views of the guide 87 (Fig. 29).

Fig. 42 is a sectional elevation of the remainder of the machine and joins up with Fig. 29 on line hh.

Fig. 43 is a similar view of the outside of machine and joins up with Fig. 29 on line hh.

Fig. 44 is a plan of Fig. 43 and joins up with Fig. 30 on line mm.

Figs. 45, 46 and 47 are sections of Fig. 43 on line nn, pp and qq.

Figs. 48, 49 and 50 are views of the guide 91, (Figs. 43 and 44).

Figs. 51, 52 and 53 are views of the guide 86a, (Figs. 43 and 44).

Figs. 54, 55 and 56 are views of the guide 93, (Figs. 43 and 44).

Fig. 57 is a section of Fig. 43 on line rr.

Figs. 58, 59 and 60 are views of the guide 86b of Figs. 43 and 44.

Figs. 61, 62, 63 and 64 are sections of Fig. 42 on lines tt, uu, xx, yy.

Figs. 65 to 75 illustrate diagrammatically the folding operation to which the blank is subjected in its passage through the machine.

Referring to Figs. 1 and 2, the machine comprises a bed 1 provided with a central slot 2 beneath which is mounted a chain conveyor 3, arranged to carry a series of pusher pieces 4, one of which is illustrated on an enlarged scale in Fig. 3. At one end of the bed of the machine is mounted a blank feeding apparatus 5 which is arranged to deliver automatically blanks to a creasing apparatus 6, and if required, to an embossing apparatus 7.

Each blank transferred to the scoring apparatus 6 and embossing apparatus 7 is moved into engagement with a group of rollers 8 which are arranged to move the same into position for engagement by one of the pusher pieces 4 of the conveyor 3. The pusher piece 4 is arranged to pick up the blank and carry the same along the bed of the machine between folders 9 and breaking rollers 10 to another set of folders 11 and a further set of breaking rollers 12. The blank thereafter passes through gumming gear 13 and a final set of folders 14 and pressure rollers 15.

By this time the shell is completely formed, gummed and collapsed and it is ejected into a stacker 16 in which the same becomes completely dry.

The method of driving the various units of the machine illustrated in Fig. 1 can be seen by reference to Fig. 2.

A pulley 17 drives shafts 18 and 19 through a set of bevel wheels 20. The shaft 18 transmits the drive to the conveyor 3 and stacking mechanism 16 through bevel gears 21. The shaft 19 drives the creasing apparatus 6 and embossing apparatus 7 through bevel gears 22 and 23 respectively. The blank feeding apparatus 5 is driven from the scoring apparatus 6 by a chain 24, and the gumming gear 13 and rollers 10, 12 and 15 are driven by a chain 25 (Fig. 1).

Referring to Figs. 4, 5, 6, 7 and 8 of the drawings, the blank feeding apparatus 5 and parts thereof are illustrated on an enlarged scale. The blank feed 5 is arranged to accommodate blanks of cardboard or like material stacked so as to lie in a substantially vertical position. The blanks are supported upon an inclined platform 26 so that the leading blank normally rests against a pair of uprights 30. The platform 26 upon which the blanks are supported is arranged to be reciprocated towards and away from the uprights 30 by a coupling rod 27 mounted at one end on an eccentric shaft 28 and supported at the other end upon a sliding bush 29 so that as the platform 26 moves towards the uprights 30, the same tends to push the stack of blanks in that direction and when receding from uprights 30 the platform 26 is arranged to move below the level of the horizontal limbs of a pair of angle guides 31 which are arranged to support the blanks. By means of the platform 26, the leading blank is maintained flush with the uprights 30 so as to lie in a substantially vertical direction.

Mounted so as to operate between the uprights 30 is a needle feed 32 (Fig. 6), which is carried upon a bar 33 pivotally mounted upon a slide 34 which is arranged to be reciprocated in a guide 35 by a crank disc 36 and a connecting rod 37. The needle feed 32 is thereby reciprocated in a vertical direction and at the same time is displaced in a substantially horizontal direction by a cam member 38 engaging with an arm 39 secured to the needle feed 32 so that as the needle feed is descending, the same is moved to engage with the leading blank and feed the same downwardly between a travelling belt 40 (Fig. 4) and a drum 41 which are arranged to carry the blank into a horizontal position from which it is fed by rollers 42 and belt 40 along the bed 1 to the scoring apparatus 6 and embossing apparatus 7. The needle feed 32 is controlled in its upward direction by the cam 38 so as to be moved out of the plane of the leading blank in the magazine, thus providing a feed which ensures that the blanks are fed positively to the shell forming mechanism at certain predetermined intervals.

A hand operated cam 38a carried upon a spindle 38b is adapted to engage with the tail 39 of the needle feed 32 and hold the same out of engagement with the cam 38 when it is desired to run the machine without feeding blanks thereto.

When the blank is moved into a horizontal position the same is received by a pair of rotating rollers 42 which in co-operation with the belt 40 feed the blank towards a pair of scoring rollers 43 and 44 which are arranged to score four lines 45 (Fig. 9) upon the blank. The scoring lines are located in a direction at right angles to the width of the blank. As the blank is fed forwardly towards the scoring rollers 43 and 44 by the belt 40 and the rollers 42, a pair of oscillating arms 46 are arranged to move in the reverse direction to the blank and are provided at their lower ends with spring controlled pawls 47 (Figs. 7 and 8) which ride over the surface of the blank and thereafter drop behind the rear edge of the blank whereupon the arms 46 are moved in the direction of movement of the blank and the pawls 47 operate to push the blank squarely to the scoring rollers 43 and 44.

After the blank has been scored, the leading edge thereof is received by two pairs of rollers 48 and 49 arranged to engage with each side of the blank and feed the same forwardly. The upper roller of one pair of rollers 48 and 49 is arranged to knurl the upper surface of the blank along its edge and the lower roller of the other pair 48 and 49 is arranged to knurl the under side of the blank along the other edge for a purpose hereinafter set forth. As the blank is fed forwardly by the rollers 48 and 49, a second pair of oscillating arms 50 are arranged to push the blank forwardly between a pair of embossing rollers 51 and 52.

The oscillating arms 46 and 50 which are rocked by links 53 and cranks 54 driven from the main drive of the machine, are arranged to engage with either side of the blank so as to feed the same squarely to both the scoring and embossing rollers. It will be found that, due to the blanks being fed forwardly by the said arms, the embossed portion of the blank is always located in the same position relatively to the scoring lines and the blanks are maintained in a definite spaced relationship relatively to one another.

After the blank has left the embossing rollers 51 and 52, the same is received by a third pair of rotating rollers 55 and 56 adapted to engage with the extremities of the blank and feed the same forwardly whilst a third pair of oscillating arms 57 corresponding to the arms 46 and 50 are adapted to move rearwardly and engage with the rearward edge of the blank to thereafter feed the same forwardly and prevent the same from being displaced laterally.

As the blanks pass through the scoring apparatus 6 and embossing apparatus 7 they are pressed into engagement with the bed 1 of the machine by a series of brushes 58 which help to maintain the blanks in correct position as they are being moved forwardly. There are also mounted upon the scoring rollers 43 and 44, cleaning brushes 59 which keep the roller free from any material liable to mar the efficiency of the scoring.

Referring to Figs. 10, 11 and 12, the blanks as they are being moved through the scoring apparatus 6 and embossing apparatus 7, have the side edges thereof supported in guides 60, and the centre portion supported upon plates 61. The guides 60 are carried on bars 62 which are carried upon the side frame of the feed mechanism. The edges of the blanks are moved through the slots 63 and the knurling rollers 48 and 49 are arranged to extend into the slots and knurl the edges of each blank in the manner hereinbefore set forth. Mounted in the said guides are the adjustable abutments 64 which are arranged to engage with the sides of each blank and maintain the same in the correct position within the guides.

When the blank is moved forwardly by the arms 57 out of the embossing apparatus, it is carried into the folding and breaking down mechanism, which comprises a series of folders and crushing rollers which automatically fold and crush the blank about various scoring lines upon a former 66 (Figs. 13 to 20) mounted above the bed of the machine and between which and the bed of the machine each blank is moved by one of the pusher pieces 4. The former 66 is mounted upon the spindle 66ª which enables the folder to be swung into a vertical position when it is necessary to remove a faulty blank and the former is held in position upon the bed of the machine by the rod 66b engaging with the clamps 66c mounted upon either side of the machine. The former 66 is undercut at 67 to permit the movement of the pusher piece 4 and the transverse cross section at various folding and crushing points along the length of the former are clearly shown in Figs. 15 to 20 of the drawings.

Referring to Figs. 21, 22, 23, 24, 25 and 26, the blank is fed from the oscillating arms 57 (Figs. 4 and 5) to rotating rollers 68, 69, 70, 71, 72 and 73 (Figs. 21 and 22) which feed the blank beneath the guide 74 so that the rearward edge thereof is located in the path of the pusher piece 4 mounted upon the endless conveyor 3 and a pair of side guides 75 are mounted so as to correctly align the blank with reference to the subsequent folding mechanism.

The blank, when located in the path of a pusher piece 4 and viewed in plan upon the bed of the machine looking in the direction of movement of the pusher piece 4, consists of five panels formed by the scoring lines 45 (Fig. 9), which comprise a narrow gum flap A, of a broad panel B, a narrow panel C, a broad panel D and second narrow panel E.

The blank is fed to the bed of the machine so that each pusher piece 4 of the conveyor 3 engages with the central point of the broad panel D (Fig. 9).

The blank is moved by the pusher piece 4 through folders 76 (Fig. 23) which are arranged to fold upwardly both the gum flap A (Fig. 9) and the second broad panel B as shown diagrammatically in Fig. 65, so that the portion of the blank which is held by the former 66 in contact with the bed of the machine comprises the two narrow panels C and E and the intervening broad panel D.

Thus it will be seen that in this folded condition the pusher piece 4 is located centrally of that portion of the shell which is located adjacent to the bed of the machine, and in consequence the shell does not tend to be moved laterally as it is moved by the pusher piece 4. The gum flap A and the second broad panel B of the shell are folded by folders 77 (Fig. 23) over the bevelled faces 78 of the former 66 (Fig. 16) as shown in Fig. 66, the former being located between the folder portions of the blank and the broad panel D and two narrow panels C and E which are in engagement with the bed 1 of the machine.

Referring to Fig. 29, after the gum flap A and the second broad panel B have been folded, the same are fed to a pair of breaking rollers 79 and 80 through guides 79a which are illustrated in detail in Figs. 33 to 35. The blank is crushed between rollers 79 and 80, and the bevelled faces 78 (Fig. 16) of the former 66, so that the crease formed between the gum flap A and the adjacent narrow panel C and the crease between the second panel B and the corresponding narrow panel E are broken as shown in Fig. 67.

The blank in this folded condition is thereafter moved through a second set of helical folders 81 (Fig. 29) which are arranged to fold the first narrow panel C together with the gum flap A and the second narrow panel E together with the second broad panel B into the positions illustrated in Fig. 68. The narrow panel C and the gum flap A and the narrow panel E and the broad panel B are thereupon folded by folders 83 which fold the same over the bevelled faces 82 (Fig. 17) of the former 66 so that the free end of the panel B (Fig. 69) extends beyond the scoring line located between the first narrow panel C and the first broad panel D. The blank is thereupon moved beneath the rollers 84 and 85 (Fig. 29), whereupon the scoring lines between the panels C and D and D and E are broken. The blank is now moved beneath guides 86, 87 and 88. The guide 87 shown in detail in Figs. 39, 40 and 41 holds the gum flap A and panel C in contact with the bevelled face of the former 66, and the guides 86 and 88 hold the free end of the second broad panel B downwardly in engagement with a gumming roller 89 (Fig. 71), and it will be found that the serrations which have previously been formed on the underside of the free end of the second broad panel B enable the gum to be applied thereto more efficiently than if the serrations were not present.

Referring to Figs. 42, 43 and 44, the blank after being gummed is thereafter moved by the pusher piece 4 into engagement with an opening tongue 90 (Figs. 19 and 20) mounted upon the former 66 which automatically folds the panels B and E into the position illustrated in Fig. 72. After the blank has been folded into the position illustrated in Fig. 72 the tongue 90 folds the panel E down on to the bed of the machine as shown in Fig. 73, whereupon the panel B engages with the guide 91, a detailed construction of which is shown in Figs. 48, 49 and 50, which folds the panel B down so that the free edge thereof overlies the gum flap A. The blank in this folded condition is passed beneath the rollers 92 which press the gummed edge of the panel B into contact with the gum flap A as shown in Fig. 75.

The shells formed from the blanks are carried from the rollers 92 by the pusher piece 4 and are moved on to the platform 94 of the stacking mechanism. The platform 94 is pivotally mounted at 95 to a bracket 96. Pivotally connected to a lug 97 on the base of the platform 94 is a link 98 which is connected to a link 99 pivotally mounted to the body of the machine at 100. A roller 101 mounted on the free end of the link 99 is arranged to engage with a cam 102 driven from the main drive of the machine, in such a manner that as each shell is delivered to the stacking mechanism, the platform 94 is automatically lowered and receives the shell, whereupon the platform is moved upwardly about the pivot and carries the shell into the vertical stacker 103. The shell, however is not pushed fully home by the pusher piece 4, and consequently a raised portion 104 on the drum 105 raises the end of the shell out of engagement with the pusher piece 4, whereupon a rocking link 106 driven by links 107 and 108 from the cam 109 pushes the shell home. The shells are supported in the stacker 103 by the brushes 110 so as to permit the downward movement of the platform 94 to receive each succeeding shell.

What I claim as my invention and desire to secure by Letters Patent is:—

1. In a shell making machine, the combination with means for folding and breaking a blank to complete the formation of all panels therein, of means for applying adhesive to one of the panels, means operative thereafter to press the adhesive coated panel against another panel, and a continuous conveyor having pusher pieces for engaging and propelling successive blanks through said first named means.

2. In a shell making machine, the combination with means for folding and breaking a blank to complete the formation of all panels therein, of means operative thereafter to apply adhesive to one of the panels, means for pressing the adhesive carrying surface of the last mentioned panel against one of the remaining panels to form a closed and sealed shell, and a continuous conveyor having pusher pieces for engaging and propelling successive blanks through said first named means.

3. In a shell making machine, the combination with an endless continuously moving conveyer having a member thereon for engaging and moving a blank, of means for folding the moving blank to form more than three panels therein, said means being so constructed and arranged with respect to the path of the said member that the latter engages the blank centrally of that portion of the blank which lies adjacent to the bed of the machine.

4. In apparatus of the class described, the combination with mechanism for scoring blanks for folding, of means for delivering blanks to said scoring mechanism, and means engaging both sides of the rear edge of each blank for moving the same through the scoring mechanism.

5. In apparatus of the class described, the combination with mechanism for scoring blanks for folding, of means for delivering blanks to said scoring mechanism, and a pair of arms oscillating in unison for engaging the rear edge of each blank on opposite sides of the center thereof for moving the blank through the scoring mechanism.

6. In apparatus of the class described, the combination with a pair of spaced guide members adapted to receive and support a moving blank therebetween, and provided with slots extending in the direction of movement of the blank for receiving the side edge portions of the latter, and having slots therein intersecting said first-named slots, of rollers extending into said last-named slots for engaging and knurling the blank adjacent each side edge thereof.

7. In apparatus of the class described, the combination with a bed, of a former for use in folding blanks supported above the bed and spaced therefrom to permit the movement of blanks between the bed and the former, and movable pusher pieces extending through the bed for engaging and moving the blanks, said former being recessed longitudinally of the direction of movement of the blanks to receive the pusher pieces therein.

8. The combination recited in claim 7, in which means are provided for pivotally supporting the former to permit ready removal of faulty blanks.

9. In apparatus of the class described, the combination with a bed, of a former supported above said bed, means for feeding blanks between the former and bed, and means cooperating with said former for bending and breaking the blank over the upper surfaces of the latter to form four parallel folding lines extending longitudinally of the direction of movement of the blank, said last-named means comprising stationary folders for simultaneously forming two scoring lines in the blank, means for thereafter breaking the blank on the scoring lines to form the completed folding lines, stationary means for simultaneously forming the remaining pair of scoring lines, and means for thereafter breaking the blank on the last mentioned scoring lines.

10. In apparatus of the class described, the combination with a bed, of a former supported above said bed, means for feeding blanks between the former and bed, and means cooperating with said former for bending and breaking the blank over the upper surfaces of the latter to form four parallel folding lines extending longitudinally of the direction of movement of the blank, said last-named means comprising stationary folders for simultaneously forming two scoring lines in the blank, means for thereafter breaking the blank on the scoring lines to form the completed folding lines, stationary means for simultaneously forming the remaining pair of scoring lines, and means for thereafter breaking the blank on the last mentioned scoring lines, said former and the cooperating folders and breaking means being so constructed that the means for feeding the blanks is always located centrally of that portion of the blank which lies adjacent to the bed of the machine.

In testimony whereof I hereunto affix my signature.

WALTER EVERETT MOLINS.